Dec. 22, 1942.  J. J. O'BRIEN ET AL  2,305,730

PULLEY STRUCTURE

Filed Jan. 20, 1940    2 Sheets-Sheet 1

Inventors
James J. O'Brien
James Strad
by Charles H. Dell Attys

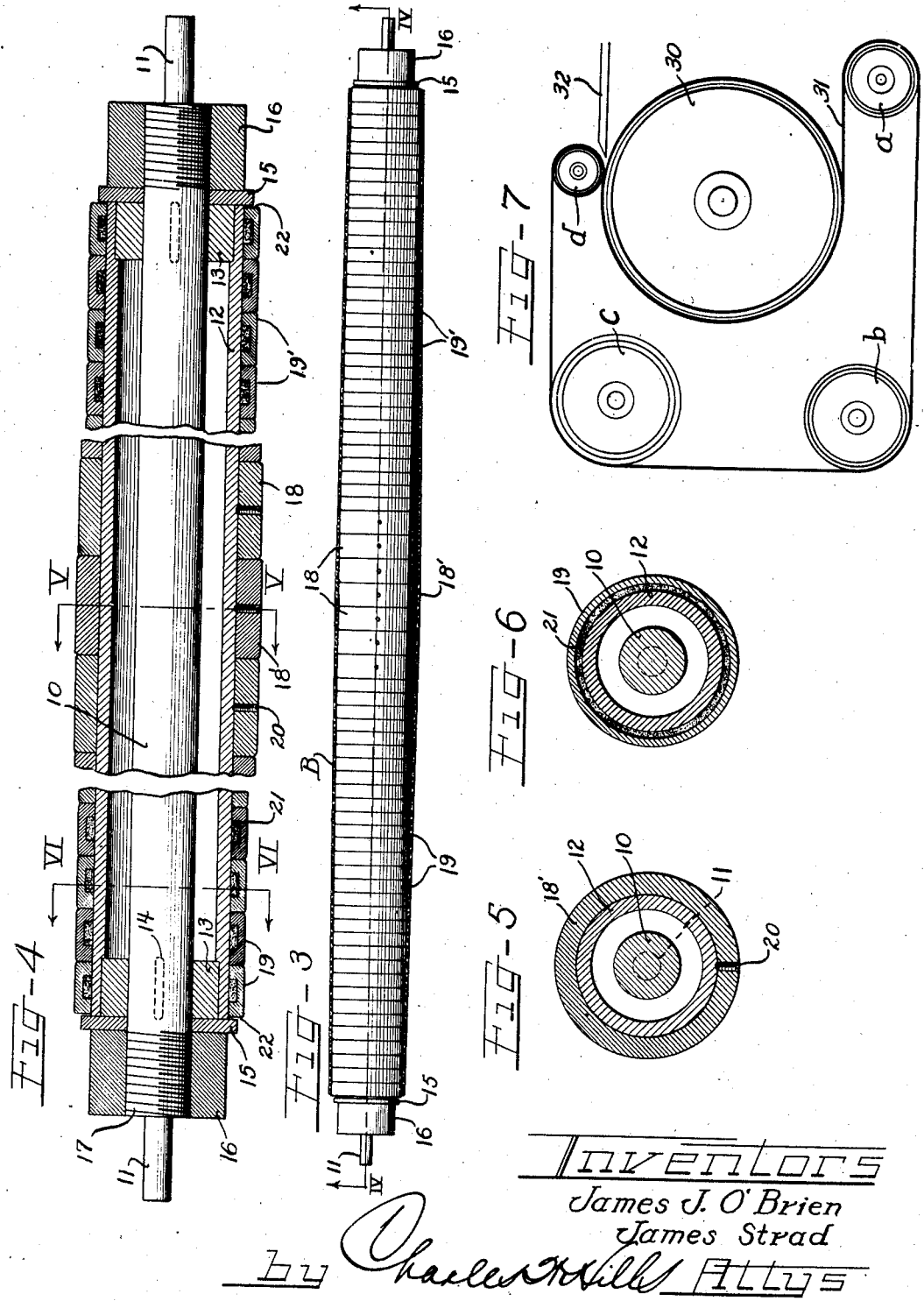

Patented Dec. 22, 1942

2,305,730

UNITED STATES PATENT OFFICE 2,305,730

PULLEY STRUCTURE

James J. O'Brien and James Strad, Chicago, Ill.

Application January 20, 1940, Serial No. 314,815

2 Claims. (Cl. 74—230.1)

This invention relates to pulley structure for supporting conveyor or drive belts.

In the support of conveyor or driving belts on pulleys, a common expedient has been to crown the pulleys in order that the belt will be held properly aligned and centered on the pulley. Such expedient is practical and efficient for pulleys and belts of more or less ordinary width, but in certain driving or conveyor assemblies, where pulleys are of extended width and comparatively small diameter, and particularly where the belt width is greater than the belt reach between pulleys, the ordinary crowned pulley will not hold the belt properly centered and aligned. The reason for this is that with the ordinary crowned wide pulley, the center or largest diameter portion will drive the belt, and if there is no slippage the speed of travel of the belt will be equal to the circumferential speed of the middle portion of the pulley. However, as, due to the crowning, the diameter gradually decreases toward the pulley end, the circumferential speed will become gradually less than the speed of travel of the belt and drag and friction will result, and if such drag and friction is unequal along the end portion of the pulley, the belt will be shifted laterally on the pulley out of center or alignment.

The important object of the invention is to produce a crowned pulley structure so designed that the circumferential speed at all points is equal to the speed of travel of the belt in order that localized drag or friction on the belt may be eliminated and the belt accurately held centered and aligned on the pulley. This is preferably accomplished by building up the pulley of comparatively narrow pulley units or laminations in axial alignment and of external diameters so that the assembly will provide a crown belt engaging periphery, the units along the middle portion of the assembly being secured to a supporting shaft structure and the units between the center portion and the ends of the assembly being free to independently rotate so as to rotate with the belt at the same speed of travel as that of the belt.

The accompanying drawings show a pulley structure embodying the features of our invention and also devices or machines in which the improved pulley structure may be advantageously employed. On these drawings:

Figure 3 is a side elevation of one form of our improved pulley structure;

Figure 4 is an enlarged section on plane IV—IV to Figure 3;

Figure 5 is a section on plane V—V Figure 4;

Figure 6 is a section on plane VI—VI Figure 4; and

Figure 1:
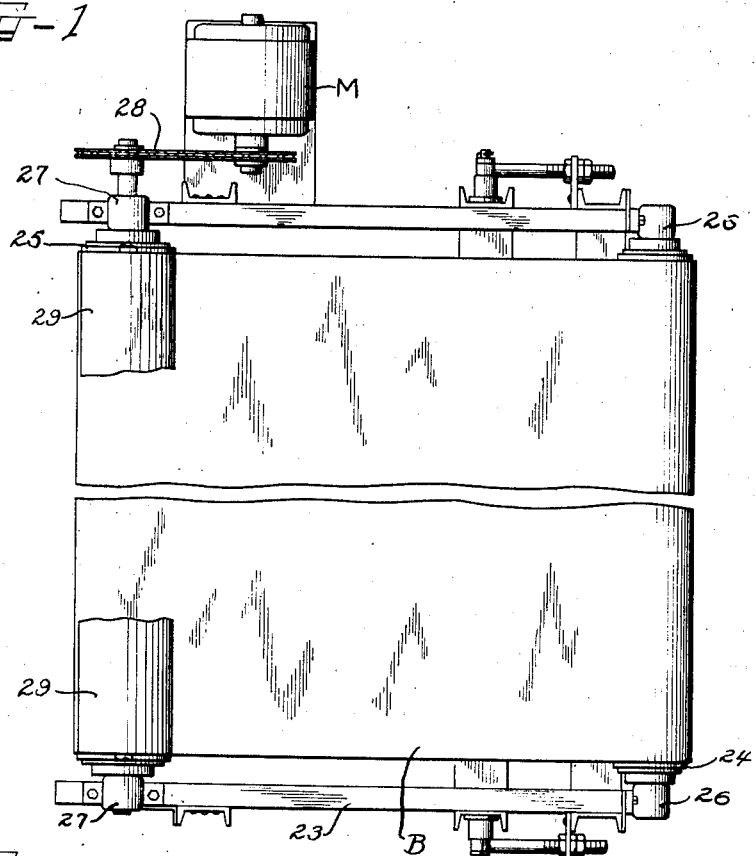
Figure 1 is a plan view of a conveyor belt and pulley assembly which may be used for conveying washed rugs for a wringing operation.

Figure 7 more or less diagrammatically illustrates another type of machine, as for example a laundering machine, in which our improved pulley structure may be advantageously used.

Referring to Figures 3 to 6, the pulley structure comprises a shaft 10 having reduced ends 11 for engaging suitable journal boxes. A tubular cylindrical support 12 is secured to end plugs or hubs 13 which receive and are secured to the shaft 10 as by keys 14 so as to rotate with the shaft. Washers or collars 15 on the shaft 10 may butt the ends of the support 12 and are abutted by nuts 16 engaging the threading 17 on the ends of the shaft 10 so that the supporting structure 12 is clamped between the nuts and rigidly secured to the shaft.

Mounted on the support 12 are a number of driving pulley units 18 and idling or guiding pulley units 19 and 19'. These pulley units are preferably comparatively narrow and substantially in the form of laminations arranged in axial alignment and engagement on the support 12. The driving units 18 are arranged along the middle portion of the support and are of ring form of comparatively small radial depth, and are secured to the support 12 as by means of setscrews 20 so that they and the support 12 will always rotate together. Any number of these middle portion units may be secured to the support 12 depending upon the extent of belt driving surface desired. The idler units 19 and 19' are also in the form of rings rotatably mounted on the support 12, and to reduce friction each ring may be interiorly channeled for holding lubricating material 21, such as graphite or graphite composition. As shown, the middle units 18 outwardly of the central unit 18' are of gradually reduced diameter, and the idling units 19 and 19' are of gradually reduced diameter outwardly toward the ends of the structure so that the unit assembly will present a crowned engaging surface for a belt B. The pulley structure will be driven by or will drive the belt only by the engagement of the belt with the middle units 18 which are secured to the support 12. The outer units 19 and 19' which are free to rotate on the support 12 will not exert any driving effort on the belt but will be rotated by engagement therewith of the belt, and as they are free to individually rotate, there will be no drag on the belt or localized frictional engagement which would tend to cause shift or lateral displacement of the belt on the pulley structure and there will be no distortion of the belt, but the belt will travel freely and smoothly with the pulley structure and remain centered and aligned thereon. The units 19 and 19' are confined on the support 12 against axial displacement between the secured middle units 18 and the washers 15, but a sufficient clearance 22 is preferably left between the washers and the respective unit rows 19 and 19' so that the units will not be subjected to axial pressure against each other so that side friction between the units is reduced to a minimum and the units may rotate or float easily on the support 12 to follow the movements of the belt engaged thereby.

Figure 2:
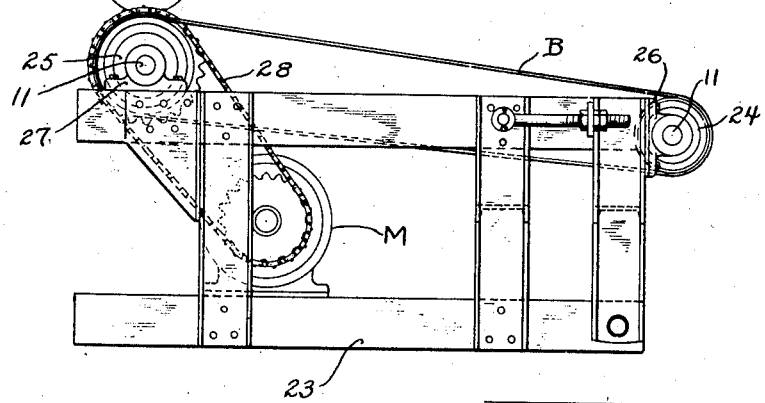
Figure 2 is a side elevation of the structure shown in Figure 1.

Figures 1 and 2 show a conveyor assembly in which our improved pulley structure may be advantageously and efficiently employed. The assembly may be a conveyor for delivering washed rugs to wringer mechanism. As shown the assembly comprises a supporting frame structure 23 which at its top mounts front and rear pulley structures 24 and 25 either of which or both may be our improved pulley structure shown on Figures 4 to 6. The front pulley structure 24 is journaled by its ends 11 in suitable journal boxes 26 on the frame 23, and the pulley structure 25 is journaled by its ends in suitable journal boxes 27. The pulley structures are engaged by a conveyor belt B, and a driving motor M is connected by a suitable drive, such as a chain belt 28, with the rear pulley structure 25. As shown, this pulley structure may serve as the lower wringer roll to be engaged by an upper wringer roll 29. The wet washed rugs are placed on the belt B to be carried thereby for feeding between the wringer rolls. In machines of this type, the width of the belt may be greater than the belt reach between the supporting pulley structures, and with the ordinary solid crown supporting pulleys, such belt will not remain centered and aligned but will creep or crawl and become distorted and will be laterally displaced on the pulleys, particularly when heavy objects such as wet rugs or the like are placed on the belt. However, with our improved pulley structure, the conveyor belts in machines of this type will remain accurately aligned and centered.

Where a pulley structure of our improved design is to be employed for driving a belt, the number of middle driving units 18 is determined for the desired driving effort of the pulley structure on the belt. Where the pulley structure is to act merely as a guide for a belt, the middle units 18, like the outer supporting and guiding units 19 and 19', may be arranged to be free to rotate on the support 12, and the pulley structure may be free to rotate in its bearing journals or not, as desired.

On Figure 7, we show more or less diagrammatically an assembly which may be an ironing machine. The ironing cylinder 30 is partially surrounded by a belt 31 traveling around a series of pulleys A, B, C and D, all of which or any number thereof may be of our improved design as shown on Figures 4 to 6, in order that the belt will remain properly aligned on the pulley structures for reception between the belt and the ironing cylinder of pieces to be ironed which are fed in along an apron 32.

We have thus produced a simple, practical and efficient pulley structure for supporting and accurately guiding belts in driving or conveyor assemblies where pulley structures of the ordinary construction will not properly function. We do not however, desire to be limited to the exact construction and arrangement shown and described as changes and modifications may be made without departing from the scope of the invention.

We claim as follows:

1. A pulley assembly comprising a shaft, a cylindrical hub mounted on said shaft for rotation therewith, belt supporting rings axially aligned along the middle portion of said hub and secured thereto for driving engagement with the middle portion of a belt, and axially aligned rings on said hub independently rotatable thereon for supporting and guiding the side portions of the belt, said rings from the middle of the ring assembly being of decreasing external diameter for presenting a crowned engaging surface for the belt.

2. A pulley comprising a cylindrical hub adapted to be mounted on a supporting shaft, belt engaging units in the form of cylindrical rings axially assembled on said hub and of decreasing external diameter from the middle portion of the assembly to the ends thereof whereby to present a crowned belt engaging surface, the units along the middle portion of the assembly being secured to the hub for driving or driven engagement with the belt, and the other units being independently rotatable on the hub for supporting and guiding the side portions of the belt.

JAMES J. O'BRIEN.
JAMES STRAD.